United States Patent
Mohammed-Fakir et al.

(10) Patent No.: US 6,572,331 B1
(45) Date of Patent: Jun. 3, 2003

(54) SUPPLEMENTAL SEAL FOR THE CHORDAL HINGE SEALS IN A GAS TURBINE

(75) Inventors: Abdul-Azeez Mohammed-Fakir, Schenectady, NY (US); Mahmut Faruk Aksit, Istanbul (TK); Ahmad Safi, Troy, NY (US); Srikanth Vedantam, Niskayuna, NY (US); Ning Fang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/029,228

(22) Filed: Dec. 28, 2001

(51) Int. Cl.$^7$ .................................................. F01D 9/04
(52) U.S. Cl. .................. 415/191; 415/209.2; 415/209.3
(58) Field of Search .............................. 415/191, 209.2, 415/209.3, 231; 277/628, 630, 637

(56) References Cited

U.S. PATENT DOCUMENTS

| | | |
|---|---|---|
| 4,184,689 A | 1/1980 | Brodell et al. |
| 4,815,933 A | 3/1989 | Hansel et al. |
| 5,149,250 A * | 9/1992 | Plemmons et al. ...... 415/209.3 |
| 5,271,714 A | 12/1993 | Shepherd et al. |
| 5,372,476 A | 12/1994 | Hemmelgarn et al. |
| 5,839,878 A * | 11/1998 | Maier ...................... 415/209.2 |
| 5,848,874 A * | 12/1998 | Heumann et al. ........... 415/189 |
| 6,095,750 A | 8/2000 | Ross et al. |

* cited by examiner

Primary Examiner—Ninh H. Nguyen
(74) Attorney, Agent, or Firm—Nixon & Vanderhye (57) ABSTRACT

In a gas turbine having a chordal hinge seal between an inner rail of each nozzle segment and an annular axially facing sealing surface of a nozzle support ring, a supplemental seal is disposed between the support ring and inner rail of the nozzle segment. The supplemental seal is formed of a preloaded flexible sheet metal seal having a first margin secured in a linear groove extending in a tangential direction along the inner rail of the nozzle segments with a bent-over edge to form a seal therewith. The opposite second margin has an edge which bears against the axially opposed sealing surface of the nozzle support ring. Sealing pressure against the preloaded flexible seal from a high pressure region maintains the seal between the sealing surfaces of the support ring and segments. The supplemental seal extends tangentially and end edges thereof overlap one another to form a seal between adjacent nozzle segments.

22 Claims, 8 Drawing Sheets

SUPPLEMENTAL SEAL FOR THE CHORDAL HINGE SEALS IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals. The supplemental seal includes flexible, preferably sheet metal, seals secured to the nozzle segments, preferably to the inner rails thereof. Each flexible seal extends in a generally linear tangential direction relative to the axis of rotation of the turbine and along an inner surface of the inner rail for sealing radially inwardly of the primary seal formed by the chordal hinge seal. In an exemplary embodiment, the flexible seal includes sealing surfaces along the inner rail and the annular sealing surface of the nozzle support ring.

Particularly, each inner rail is provided with a chord-wise extending groove which receives a first margin of the flexible seal. This first margin of the flexible seal is bent or folded to bear in sealing engagement against a surface, preferably the base of the groove, to form the seal with the inner rail. To retain the first margin of the flexible sheet metal seal in the groove, an elongated strip is secured to the flexible seal along the first margin. The flexible seal is slidable in a tangential direction into the groove upon installation. The groove has a flange and the strip includes an opposing overlapping flange which retains the flexible seal against radial dislocation from the groove. Preferably a second elongated strip is provided along the opposite side of the margin from the first strip to locate the margin of the strip centrally of the groove.

The opposite second margin of the flexible seal includes an edge which bears against the annular first sealing surface of the nozzle support ring. Because the flexible seal is located radially inwardly of the chordal seal, the inner surface of the flexible seal is exposed to the high pressure region. This causes the second margin of the flexible sheet metal seal to bear and seal against the first sealing surface of the nozzle support ring. The flexible seal is also preloaded or biased to engage its second margin in sealing relation against the sealing surface of the annular support ring. The flexible seal is preferably fabricated in chord-wise extending segments corresponding to the extent of each nozzle segment. At the joint between adjacent segments, the flexible seals are overlapped. This enhances the sealing capacity of the supplemental seal adjacent the juncture of the nozzle segments.

In a preferred embodiment according to the present invention, there is provided a turbine comprising a turbine nozzle support ring having a generally axially facing first surface, a turbine nozzle segment having at least one stator vane and a second surface in axial opposition to the first surface, one of the first and second surfaces including an axially extending projection therealong for engagement with another of the first and second surfaces to form a seal therebetween and a flexible seal extending between the nozzle segment and the first surface and between opposite side edges of the segment, a first margin of the flexible seal being secured to the nozzle segment and a second margin of the flexible seal sealingly engageable with the first surface.

In a further preferred embodiment according to the present invention, there is provided a turbine comprising a turbine nozzle support ring having a generally axially facing first surface, a plurality of turbine nozzle segments each having at least one stator vane and forming a generally annular second surface in axial opposition to the first surface, each of the segments including an axially extending projection along the second surface thereof for engagement with the first surface to form a seal therebetween, a plurality of flexible seal segments extending between the segments and the first surface, each flexible seal segment having a first margin secured to one of the nozzle segments and a second margin sealingly engageable with the first surface, the second margin extending generally linearly in a tangential direction relative to a rotational axis of the turbine.

DETAILED DESCRIPTION OF THE INVENTION

Figure 1:
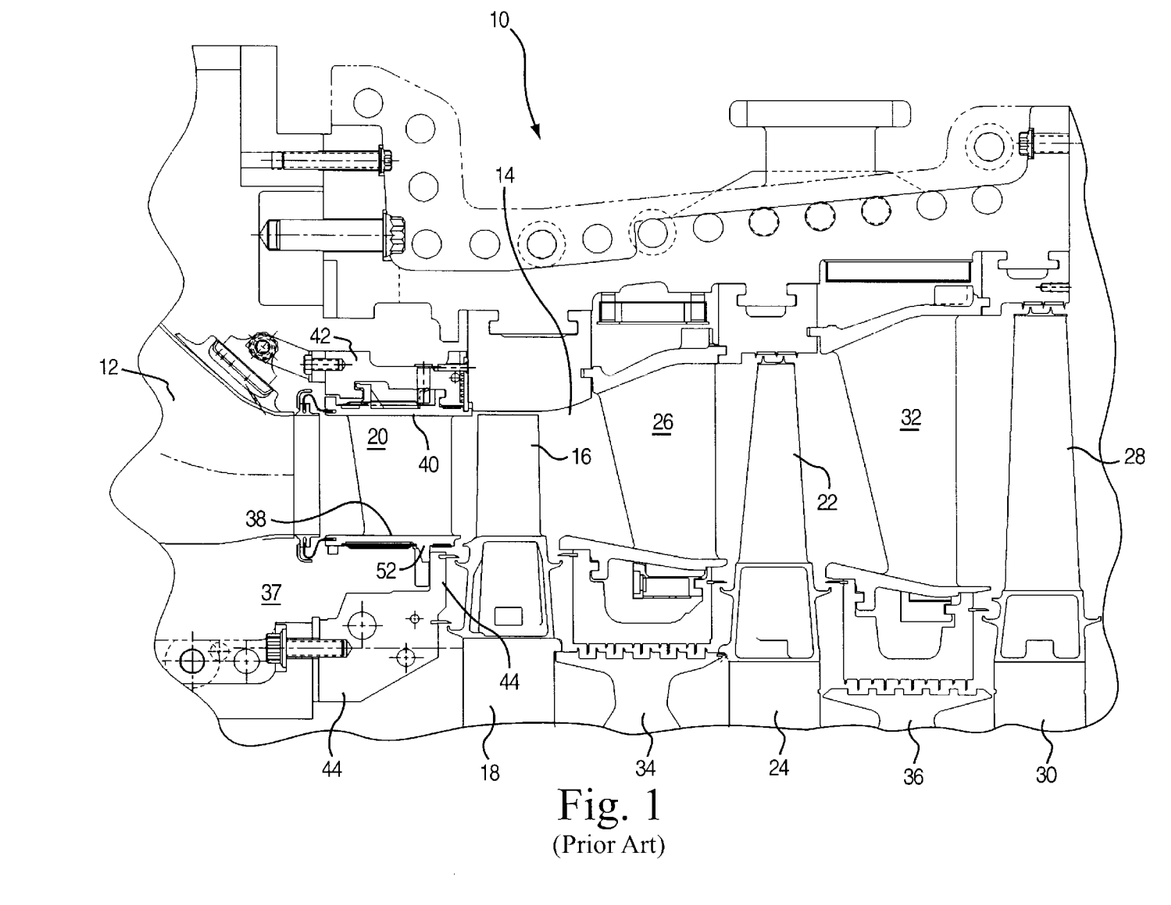
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
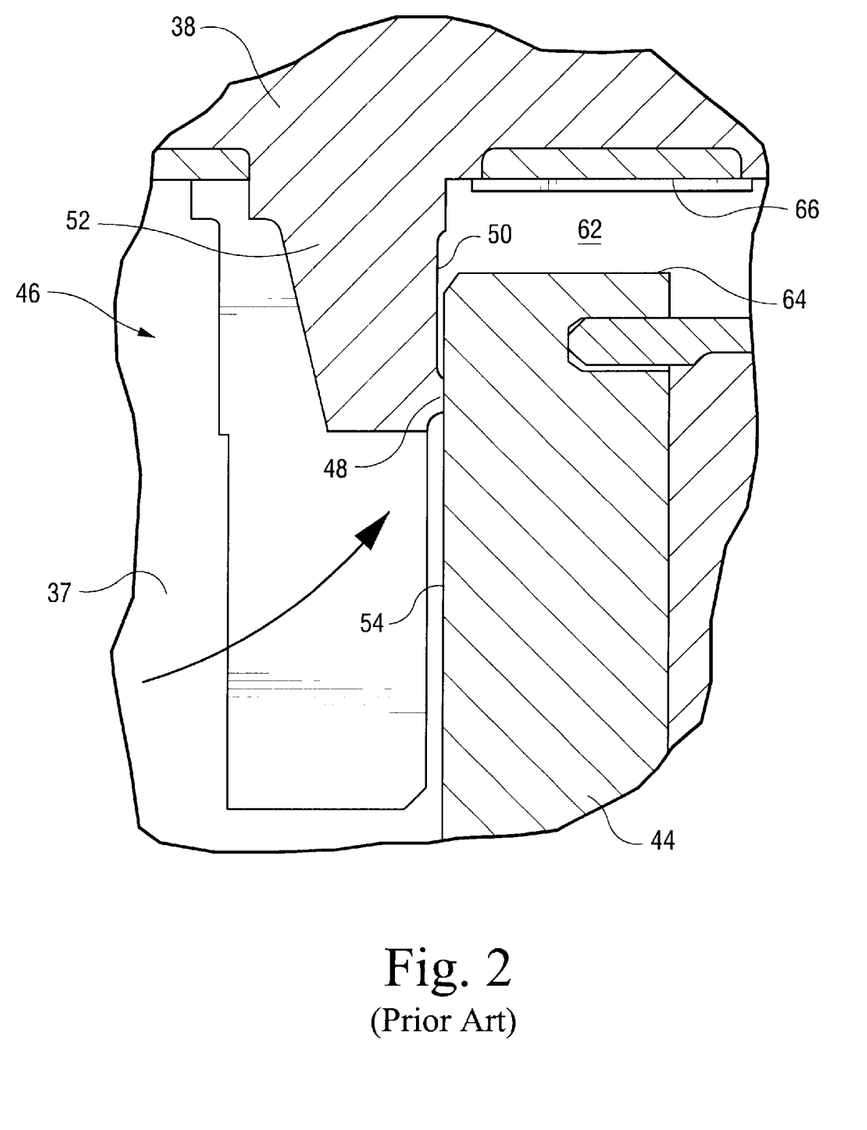
FIG. 2 is an enlarged fragmentary cross-sectional view illustrating a conventional chordal seal hinge.
Figure 3:
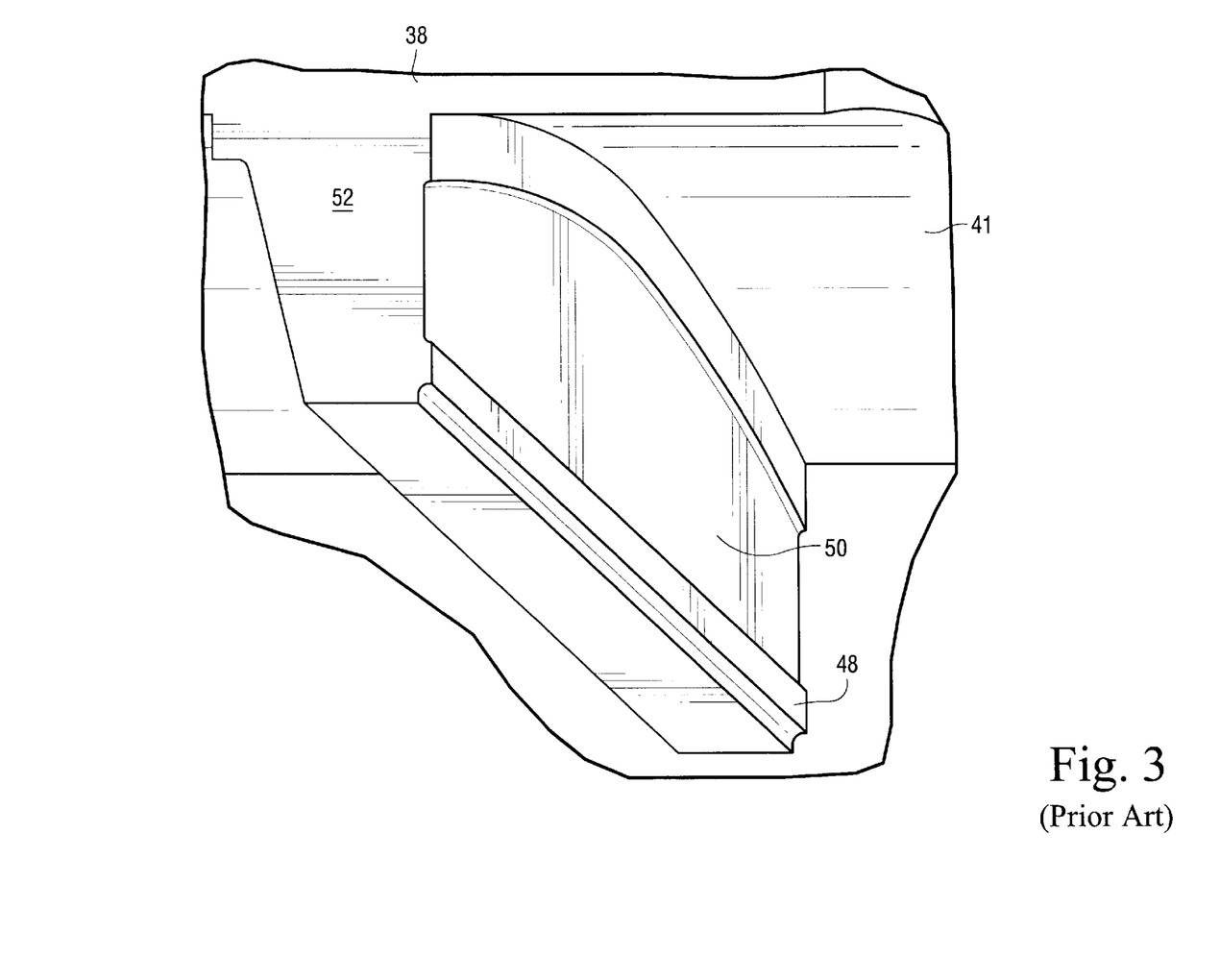
FIG. 3 is a fragmentary perspective view illustrating a portion of a conventional chordal hinge seal along an inner rail of a nozzle segment.
Figure 4:
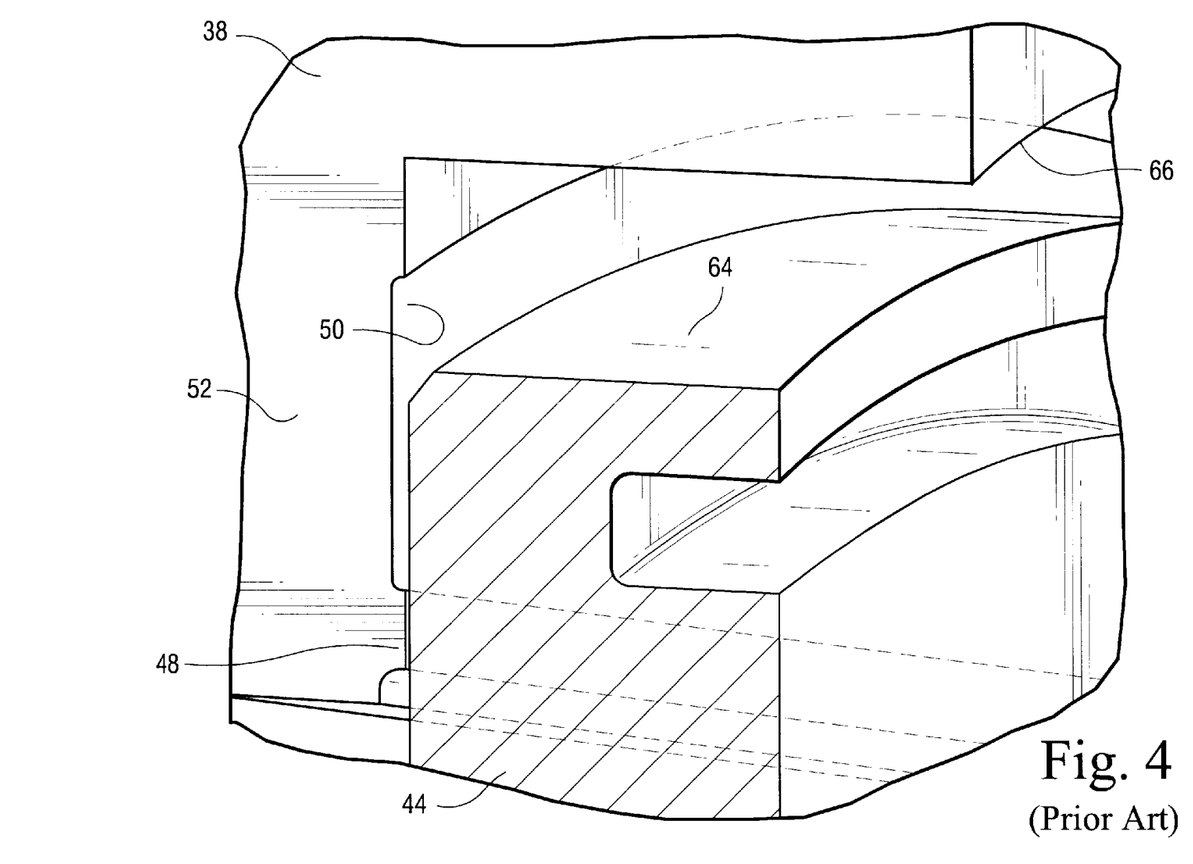
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 2) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38 and supports the nozzles against axial movement in the aft direction. Particularly, the interface between the inner band 38 and the nozzle support ring 44 includes a chordal hinge seal, generally indicated 46 (FIG. 2). The chordal hinge seal 46 includes a chord-wise, linearly extending axial projection 48. Projection 48 extends along an axial facing surface 50 of an inner rail 52 which forms an integral part of each nozzle segment and specifically the inner band 38. The projection 48 engages a first annular surface 54 of the nozzle support ring 44. It will be appreciated that high pressure compressor discharge air lying in the region 37 and lower pressure hot gases flowing in the hot gas path 14 lie on the opposite sides of the seal 48. The chordal hinge seal 46 thus is intended to seal against leakage from the high pressure region 37 into the lower pressure region of the hot gas path 14.

As noted previously, however, in operation, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally indicated 70, includes a generally linearly, tangentially extending seal for sealing between the turbine nozzle support ring 44 and the nozzle segments, particularly the inner rails 52 thereof. The seal 70 is radially inwardly of the chordal hinge seal 46 and is thus positioned such that leakage flow past the supplemental seal 70 is sealed against further flow into the lower pressure hot gas path by the chordal hinge seal 46.

Particularly, the supplemental seal 70 is formed of sheet metal fabricated to extend in straight or linear tangential lengths in chord-wise directions about the axis of the turbine. The seal 70 is provided in segments 71 each having a chord-wise extent corresponding to the chord-wise extent of each nozzle segment 41, i.e., each seal segment 71 extends linearly between side edges of each nozzle segment.

Figure 5:
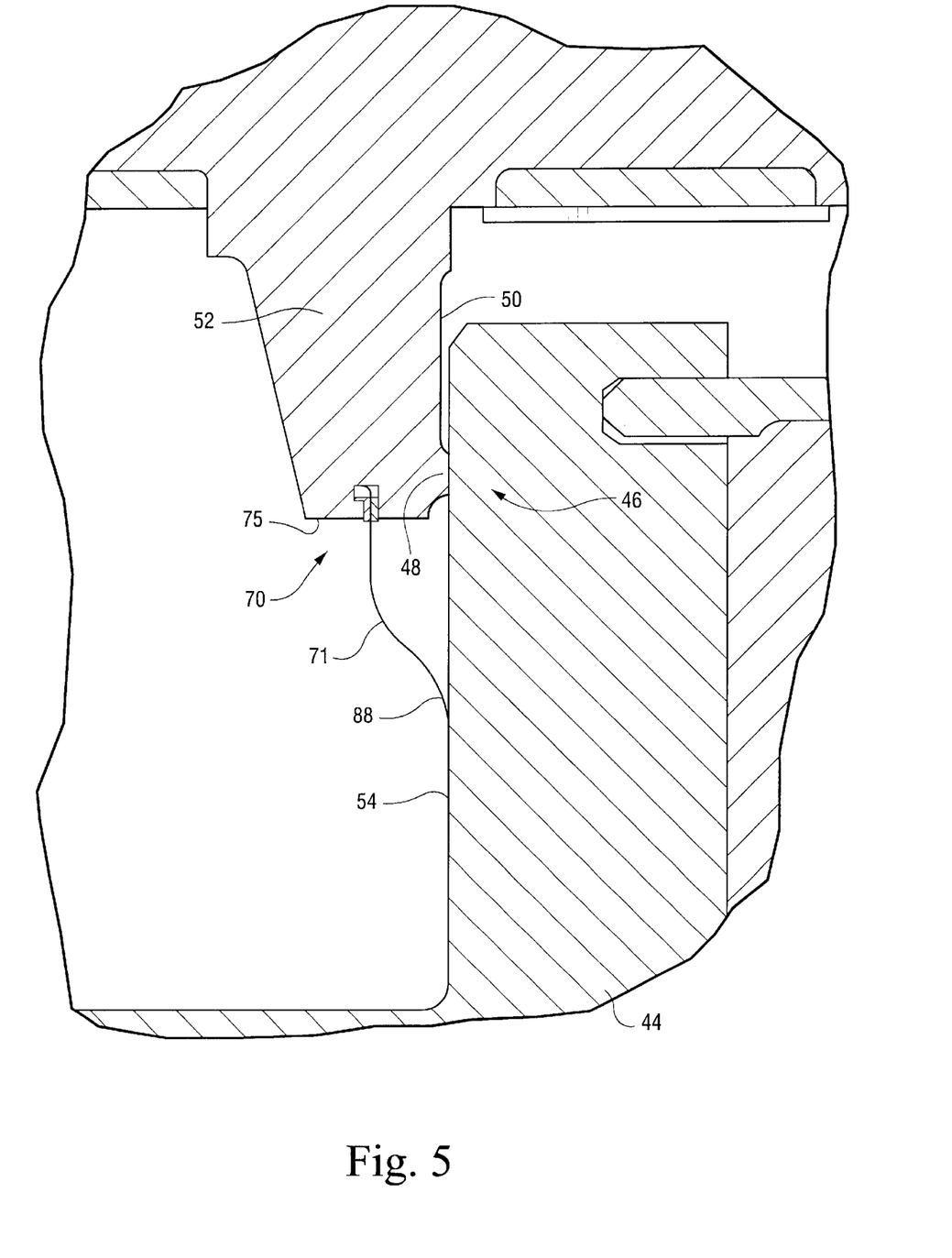
FIG. 5 is an enlarged cross-sectional view of a chordal hinge seal and a supplemental flexible seal constructed in accordance with a preferred embodiment of the present invention.
Figure 6:
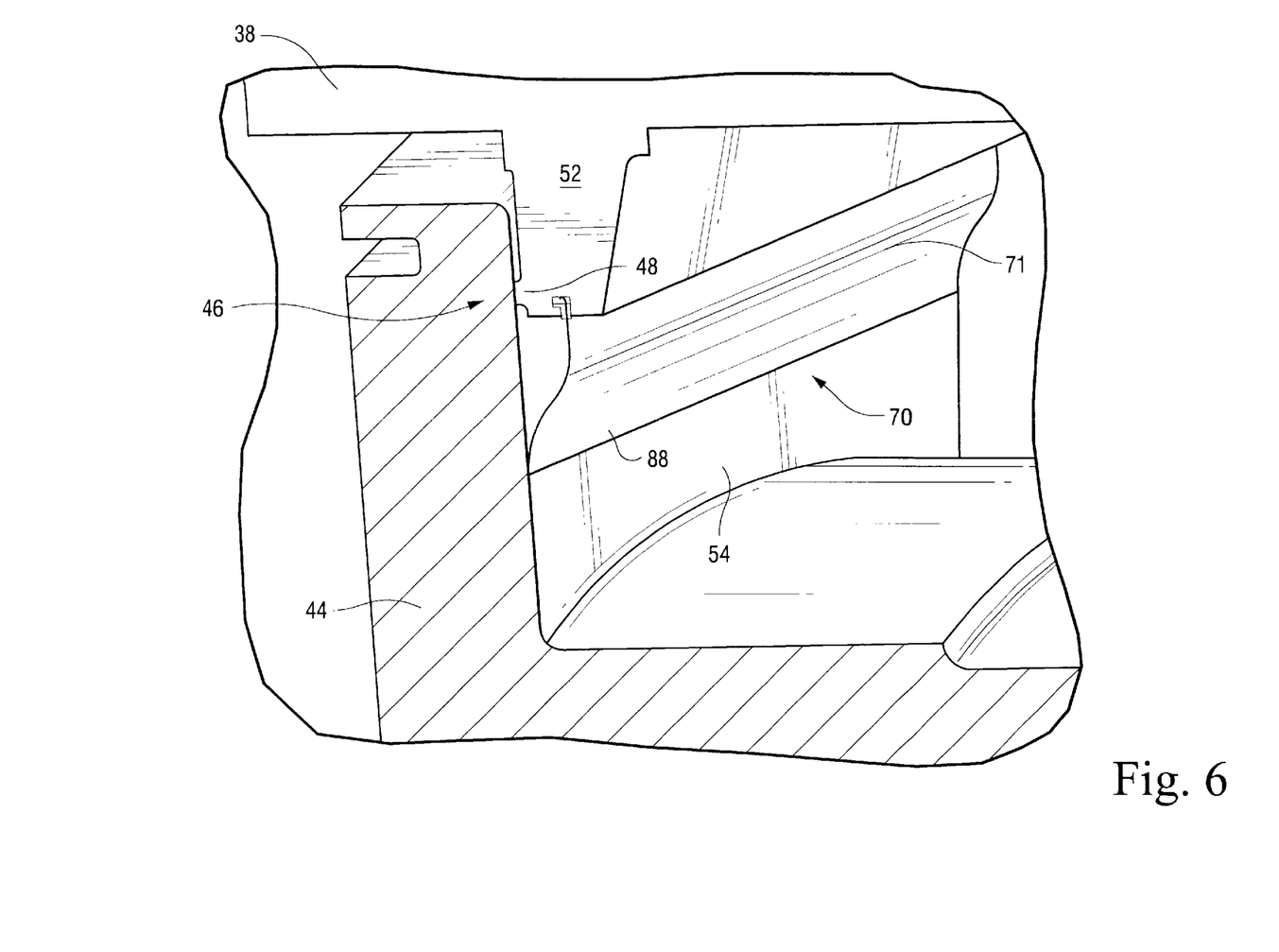
FIG. 6 is a fragmentary perspective view illustrating the inner rail of a segment and the locations of the chordal hinge seal and flexible seal.

More particularly, each supplemental seal 70 is anchored in a groove formed in a corresponding nozzle segment and preferably is anchored in a groove 74 formed along a radially inwardly facing surface 75 of the inner rail 52. As illustrated in FIG. 5, the supplemental seal lies radially inwardly of the chordal hinge seal 46 thereof. The groove 74 has an axially and linearly extending flange 76. The sheet metal supplemental seal 70 has a margin 78 (FIG. 7) which is received within the linear groove 74. The edge 80 of the sheet metal seal margin 78 is bent or folded over to bear against a surface of groove 74, preferably the base 77 of groove 74. In this manner, the supplemental sheet metal flexible seal 70 seals against passage of a fluid, e.g., air, from one side of the seal to the opposite side along the groove 74.

Figure 7:
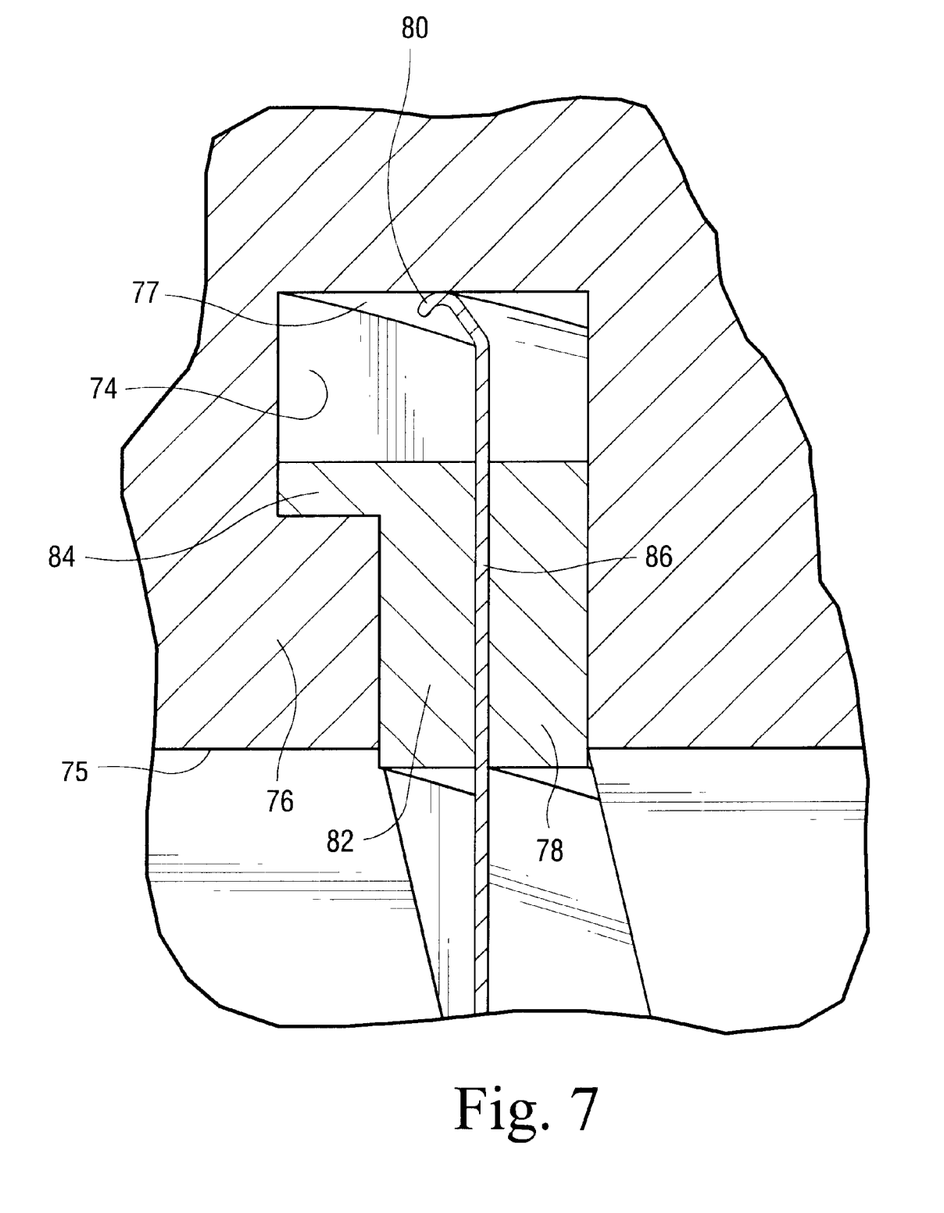
FIG. 7 is an enlarged fragmentary cross-sectional view illustrating the securement of the flexible seal along its first margin in a groove of the inner rail.
Figure 8:
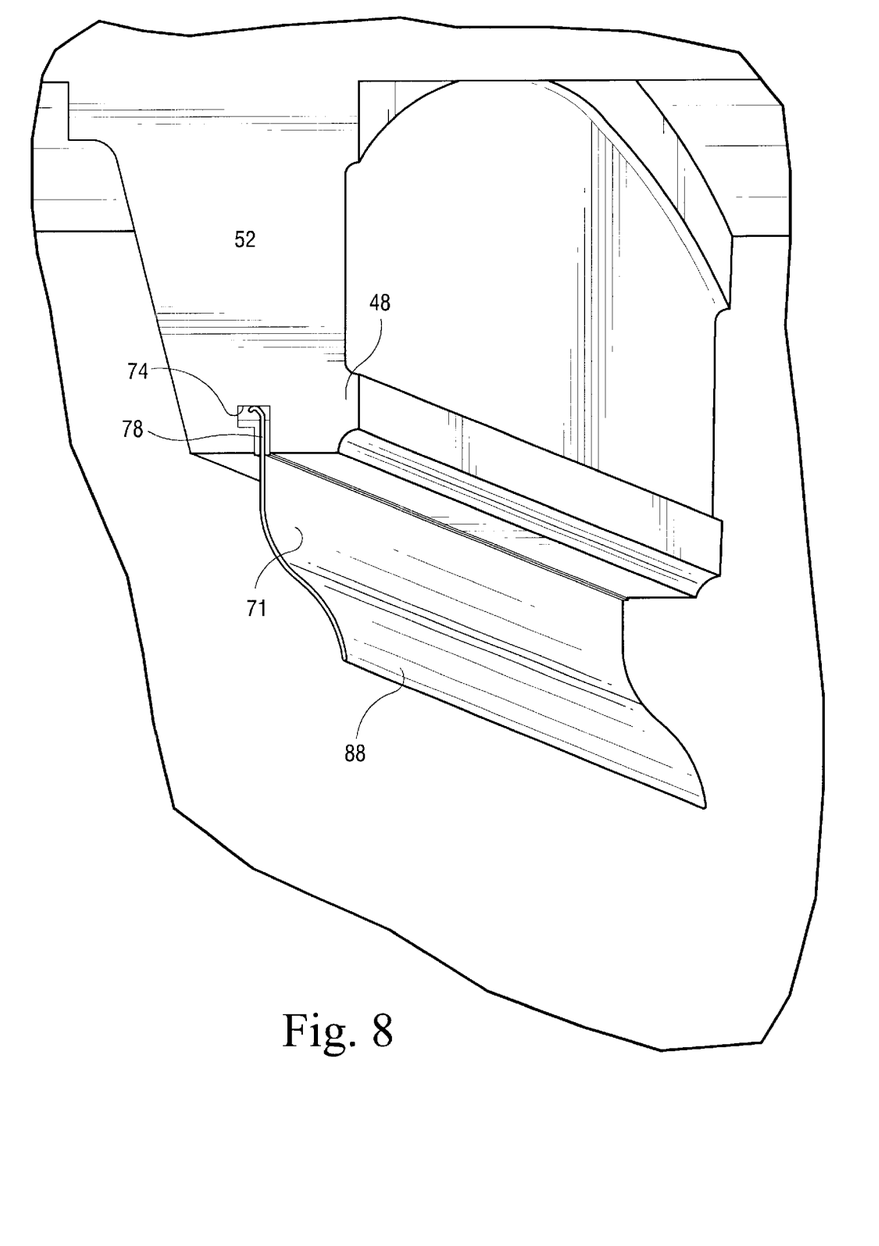
FIG. 8 is an enlarged fragmentary perspective view of the supplemental seal and its mounting along the inner rail.

To retain the flexible seal 70 in groove 74, at least one elongated strip of metal 82 is secured, for example, by welding, along one side of the margin 78 of the sheet metal seal 70. The elongated strip includes a flange 84 which cooperates with the flange 76 to retain the margin of the seal within the groove 74. Preferably, an elongated metal strip 86 is likewise secured along the opposite side of the margin from the first strip 82, thus locating the margin 78 of the flexible sheet metal seal centrally within the linear groove 74.

The opposite margin 88 of the seal 70 bears against the opposite sealing surface, i.e., the axially facing sealing surface 54 of the nozzle support ring 44. The margin 88 is preloaded or biased to bear against surface 54. Margin 88 also extends in a chord-wise tangential direction about the rotor axis similarly as margin 78.

In use, the supplemental flexible seal 70 lies radially inwardly of the chordal hinge seal 46 and extends between the inner rail 52 and the first surface 54 of the nozzle support ring 44. It will be appreciated that high pressure region 37 serves to maintain the free margin 88 of seal 70 in tight sealing engagement against the sealing surface 54 of the nozzle support ring 44. The seal 70 is also preloaded such that margin 88 bears against surface 54. The securement between the flexible seal 70 at its margin 78 as indicated previously also seals against any leakage flow about margin 78 and groove 74.

Because the flexible seal is formed in linear seal segments 71, it extends between opposite sides of the nozzle segments. At the joint between adjacent nozzle segments, the seal segments 71 overlap with one another and thus enhance the supplemental seal at those locations. It will also be appreciated that only a minimal change in the existing components of the turbine in the region of the chordal hinge seal 46 is required to effect the supplemental seal. The linear groove 74 can be readily formed in the radial inner surface 75 of the inner rail 52 using EDM techniques. It will also be appreciated that the supplemental flexible seal segments 71 are inserted into the grooves 74 in a tangential direction and that suitable stops, not shown, may be provided along the grooves to prevent tangential movement of the flexible seals after installation. Also, the supplemental seal 70 employs metal-to-metal contact adjacent its opposite margins and thus has excellent sealing and long wear capabilities.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
    a turbine nozzle support ring having a generally axially facing first surface;
    a turbine nozzle segment having at least one stator vane and a second surface in axial opposition to said first surface;
    one of said first and second surfaces including an axially extending projection therealong for engagement with another of said first and second surfaces to form a seal therebetween; and
    a flexible seal extending between said nozzle segment and said first surface and between opposite side edges of said segment, a first margin of said flexible seal being secured to said nozzle segment and a second margin of said flexible seal sealingly engageable with said first surface.

2. A turbine according to claim 1 wherein said flexible seal extends generally linearly in a tangential direction relative to an axis of the turbine, said first margin sealing against said segment.

3. A turbine according to claim 1 wherein said flexible seal comprises sheet metal.

4. A turbine according to claim 1 including a groove formed in said segment, said flexible seal being formed of sheet metal and said first margin of said seal including an edge of said sheet metal bent to sealingly engage a surface of said groove.

5. A turbine according to claim 4 wherein said bent sheet metal edge engages a base of said groove.

6. A turbine according to claim 4 wherein said sheet metal and said groove extend generally linearly in a tangential direction relative to an axis of the turbine.

7. A turbine according to claim 1 including a groove formed in said segment, said flexible seal being formed of sheet metal, an elongated first strip secured to said flexible seal along said first margin thereof and engaging within said groove to retain said flexible seal in said groove.

8. A turbine according to claim 7 including an elongated second strip secured to said flexible seal along an opposite side of said first margin from said first strip and engaging within said groove to retain said flexible seal in said groove.

9. A turbine according to claim 8 wherein said first margin includes an edge of said sheet metal bent to sealingly engage a surface of said groove.

10. A turbine according to claim 9 wherein said bent edge extends beyond said strips and sealingly engages a base of said groove.

11. A turbine according to claim 1 wherein said flexible seal is preloaded to sealingly engage said first surface.

12. A turbine according to claim 1 wherein said nozzle segment includes a radially inwardly projecting inner rail carrying said second surface, said inner rail including a radially inwardly opening groove formed in said inner rail and extending linearly along a chord line of said inner rail, said first margin of said flexible seal being disposed in said groove.

13. A turbine according to claim 12 wherein said flexible seal is formed of sheet metal, said first margin of said seal including an edge thereof in sealing engagement with a surface of said groove.

14. A turbine comprising:
    a turbine nozzle support ring having a generally axially facing first surface;
    a plurality of turbine nozzle segments each having at least one stator vane and forming a generally annular second surface in axial opposition to said first surface, each of said segments including an axially extending projection along said second surface thereof for engagement with said first surface to form a seal therebetween;
    a plurality of flexible seal segments extending between said segments and said first surface, each said flexible seal segment having a first margin secured to one of said nozzle segments and a second margin sealingly engageable with said first surface, said second margin extending generally linearly in a tangential direction relative to a rotational axis of the turbine.

15. A turbine according to claim 14 wherein said axially extending projection along each of said nozzle segments extends along a chord line of each said segment to form a chordal hinge seal, said first margin of each said flexible seal segments extending generally linearly along said nozzle segment in a generally tangential direction relative to said turbine axis.

16. A turbine according to claim 14 wherein said flexible seal segments form chordal elements about an axis of the turbine.

17. A turbine according to claim 14 wherein ends of said flexible seal segments adjacent adjoining ends of said nozzle segments overlap with one another to form a seal between said adjacent nozzle segments.

18. A turbine according to claim 14 wherein each of said flexible seal segments comprises sheet metal.

19. A turbine according to claim 14 including a groove formed in each nozzle segment and extending generally linearly in a tangential direction relative to said turbine axis, said flexible seal segments being formed of sheet metal and having first margins sealingly engaging surfaces of each of said grooves, respectively.

20. A turbine according to claim 14 wherein each said flexible seal is preloaded to sealingly engage said first surface.

21. A turbine according to claim 14 wherein said axially extending projection along each of said nozzle segments extends along a chord line of each said segment to form a chordal hinge seal, each said flexible seal segment extending generally linearly along an associate nozzle segment in a direction tangential to an axis of the turbine.

22. A turbine according to claim 21 wherein each of said flexible seal segments comprises sheet metal.

* * * * *